(No Model.) 2 Sheets—Sheet 1.

S. S. WHEELER & C. G. CURTIS.
ELECTRIC BATTERY.

No. 358,314. Patented Feb. 22, 1887.

Witnesses

Inventors.

(No Model.)  2 Sheets—Sheet 2.

S. S. WHEELER & C. G. CURTIS.
ELECTRIC BATTERY.

No. 358,314.  Patented Feb. 22, 1887.

Witnesses  Inventors
Geo. W. Breck  Schuyler S. Wheeler
Chas. J. Maguire  Chas. G. Curtis

UNITED STATES PATENT OFFICE.

SCHUYLER S. WHEELER AND CHARLES G. CURTIS, OF NEW YORK, N. Y., ASSIGNORS TO THE C. & C. ELECTRIC MOTOR COMPANY.

ELECTRIC BATTERY.

SPECIFICATION forming part of Letters Patent No. 358,314, dated February 22, 1887.

Application filed August 14, 1886. Serial No. 210,885. (No model.)

*To all whom it may concern:*

Be it known that we, SCHUYLER S. WHEELER and CHARLES G. CURTIS, of the city, county, and State of New York, have invented certain new and useful Improvements in Electric Batteries, of which the following is a specification.

In an application filed by said Curtis and Francis B. Crocker March 29, 1886, there is described a form of battery which is adapted for supplying very strong currents, and in which the battery is put in operation by lowering the electrodes into the solution, and the amount of current regulated by varying the depth of immersion.

The object of our present invention, which is especially applicable to such batteries as those described in said application, but is also applicable to other batteries, is to provide means for conveniently raising and lowering the electrodes and setting them at any desired depth of immersion by means of a handle or lever, and to enable this to be done in such a way that when the hand is removed from the handle the electrodes will remain fixed at that point and immersed to that extent.

Figure 1:
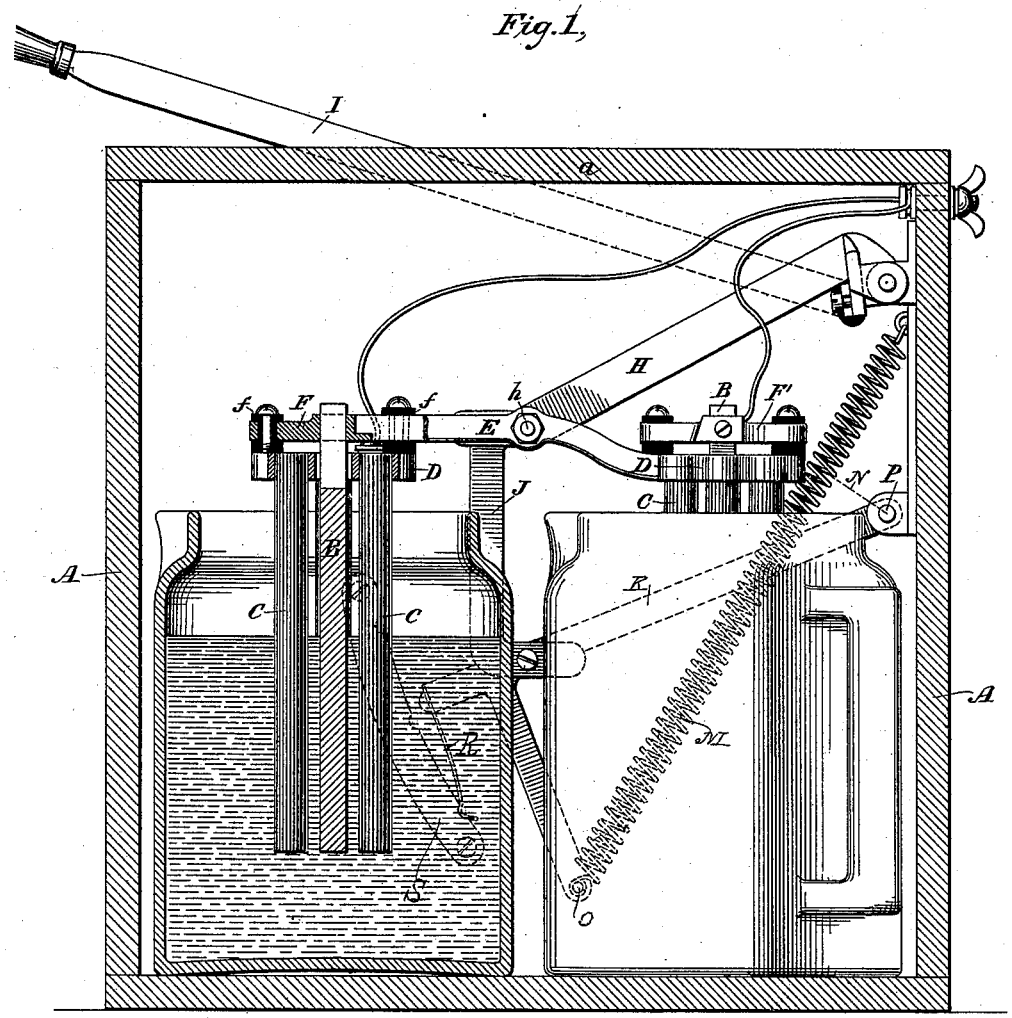
Figure 2:
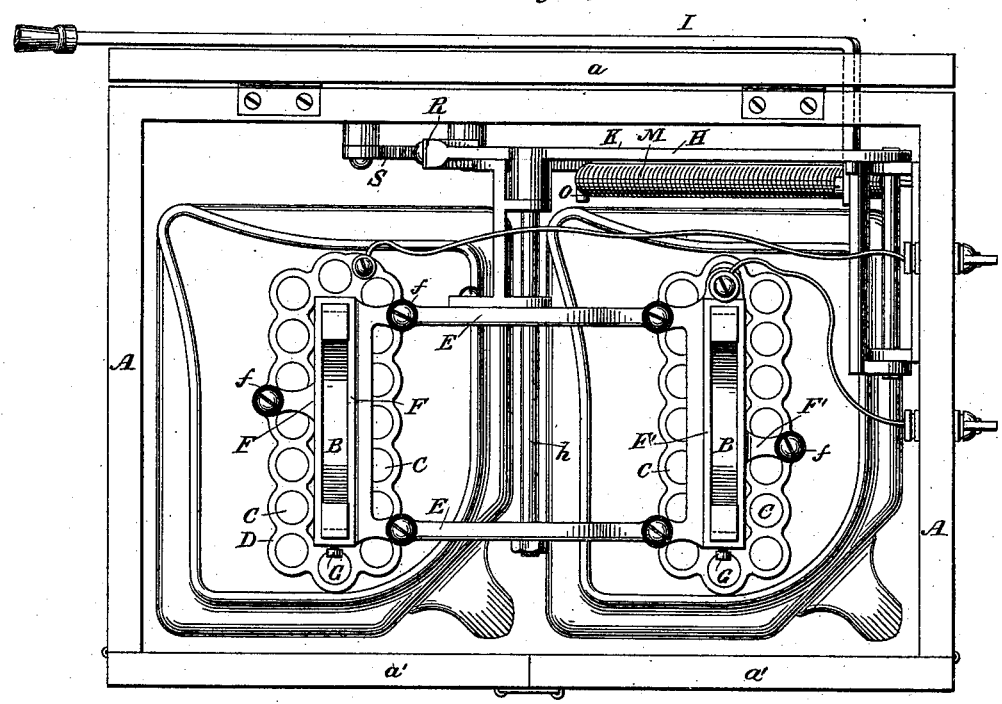

Our invention is illustrated in the accompanying drawings, Figure 1 being a front view of our battery, showing it inclosed in a box, the front of which is removed or opened, Fig. 2 being a top view of the same, showing the top or cover of the box open.

We have shown our battery, comprising two cells, inclosed in a convenient form of box, A, so that it can be easily carried about; but of course it may be inclosed or mounted in any other form of box or compartment. This box we form with a hinged cover or top, a, and a front of two hinged doors, a' a', so that the front can be opened and the battery-jars or liquid-holders conveniently taken out of the box.

We have shown the battery-jars made in the form of rectangular jars or pitchers, and formed with lips at one corner and handles at the diagonally-opposite corners, like the jars we have described and claimed in an application filed by Curtis and Crocker March 29, 1886; but of course in this battery any other desired form of jar or liquid-holder may be used, if preferred.

The form of electrodes shown in the drawings, and which we prefer to employ, though of course other forms of electrodes may be used, if desirable, is the same as those described in the application filed by Crocker and Curtis, Serial No. 196,933, before referred to. These consist of zinc plates B and carbon bars or pencils C, the carbons being mounted in and electrically connected with metal holders or frames D. In cases where it is desired to use two or more cells and have them connected in series, we form the carbon-holder D, which supports the carbons of one cell, with a projecting portion or connecting-arms, E E, which extend across to the adjacent cell and terminate in a slotted frame or zinc-holder, F, which is rigidly attached to but insulated by rubber bushings f from the carbon-holder of the same cell, as clearly shown. If more than two cells be employed, the carbon-holder D of the second cell is formed with arms or extensions E, like that of the first cell, which reach over to the third cell and connect with and support its zinc, and so on through as many cells as desired. The zinc of the first cell is mounted in and connects with a special holder, F', which is attached to but insulated from its carbon-holder in the same way, as clearly shown.

The zinc-holders F are formed with slots, through which the zincs can be conveniently dropped, and which hold them in their proper positions, the zincs being firmly held in place and electrically connected with their holders by screws G, as clearly shown. In order that the electrodes may be conveniently raised and lowered, we mount them upon a pivoted arm, H, which, in cases where two cells are employed, we form with a bar or pin, h, which passes loosely through the arms or portion E E. The arm H is pivoted or hinged to the side of the battery-box or other support, and is provided with a handle, I, on the outside of the box, which can readily be attached or detached when desirable.

In order to steady the electrodes and hold them in a vertical position as they rise and fall, we rigidly fix to one of the arms E, or some part of the frame which connects two sets of electrodes, an arm, J, which projects downward and is pivoted to a steadying-arm, K, which is also pivoted to the side of the box immediately below the pivot or axis of revolution of the arm H, and which works parallel to the arm H. With this arrangement the electrodes can very conveniently be raised and lowered by simply moving the arm or handle I, and, being mounted on the arm H, they move through a small arc of revolution about the axis of the arm H, so that they have a slight movement sidewise; but this movement is immaterial in most cases, and the electrodes are prevented from oscillating and kept vertical throughout the whole stroke.

In order that the electrodes, when set at any desired depth of immersion, may remain fixed at that depth, so that all that is necessary to do is to set the handle I at the right point and remove the hand, we provide a balance-spring to support and balance or more or less balance the weight of the electrodes. This balance-spring may be arranged in any desired way for this purpose, but we prefer to arrange it, as shown in the drawings, by attaching one end of the spring M to the side of the box or to the hinge of the arm H, and the other end to an elbow or portion of the arm K which projects downward. The object of this construction is to cause the vertically-upward or effective pull of the spring in the direction of the electrodes to be the same, so as to just balance the electrodes at all points of their stroke. When the electrodes are in the position shown, the spring M is stretched more than if the electrodes were immersed less, and consequently it exerts a greater pull in the direction of its length; but in this position its pull, although greater, is less effective in supporting the weight of the electrodes, because it is pulling with a smaller lever-arm, N, or, in other words, with a less leverage, whereas, as the electrodes are raised, the free end O of the spring, being fixed to the elbow of the arm K, swings around the point P, so that while this allows the spring to shorten and reduces its pull, it correspondingly increases the distance or lever-arm N, with which the spring acts around the fulcrum P, so that the moment or effective pull of the spring in the proper direction remains practically the same in whatever position the electrodes be placed.

By properly proportioning the tension and length of the spring and the dimensions of the various parts the spring may be made to exert a pull tending to support or balance the electrodes, which is practically the same, and just balances the weight of the electrodes at all points in their rise and fall.

In order that the electrodes, when immersed to any desired depth, shall remain set at this point, we provide a friction holding device, R, which prevents the electrodes from either moving up or down in case their weight is not exactly balanced by the spring. This device may be made in the form of a flat spring, R, fixed to some part of the arm K, which bears strongly against and travels over the face of a stationary curved edge or arc, S, as clearly shown. The edge of this stationary arc may be made perfectly circular, and the simple friction between it and the spring R relied on to overcome any tendency of the arm H to rise or fall; or the arc may be notched at different points, as shown, so that the end of the spring will drop into these notches and hold the arm H more firmly at the points at which the notches are placed, wherever they may be.

What we claim as our invention, and desire to secure by Letters Patent, is—

1. The combination, with the electrode or electrodes of a battery, of mechanism to raise and lower the electrodes out of and into the solution, and a counterbalancing-spring connected or combined with the raising and lowering movement so as to exert practically the same balancing or supporting effect at all points of the stroke, substantially as described.

2. The combination, with the electrode or electrodes of a battery, of mechanism to raise and lower the electrodes out of and into the solution, means for counterbalancing or partly counterbalancing the weight of the electrodes, and a friction holding device arranged to take up or support any excess of the weight over the supporting power of the counterbalancing device, or any excess of the supporting power of the counterbalancing device over the weight, and thereby hold the electrodes fixed at any point, substantially as described.

3. The combination, with the electrode or electrodes of a battery, of mechanism to raise and lower the electrodes out of and into the solution, means for practically balancing or supporting the weight of the electrodes and constructed to exert practically the same balancing or supporting effect at all points of the stroke, and a friction holding device arranged to take up or support any excess of the weight over the supporting power of the spring, or any excess of the supporting power of the spring over the weight, substantially as described.

4. The combination, with the battery box or support A, of the arm H, pivoted thereto, the rising and falling electrode or electrodes pivoted or mounted on and guided by the free end of the arm H, and means for holding the electrode vertical or practically vertical as it rises and falls.

5. The combination, with the battery box or support A, of the arm H, pivoted thereto, the rising and falling electrode or electrodes pivoted or loosely mounted on the free end of the arm H, and the arm K, one end of which is also pivoted to the box or support and the free end of which is connected to the electrodes, so as to guide or steady them as they rise and fall.

6. The combination, with the battery box or support A, of the arm H, pivoted thereto, the rising and falling electrode or electrodes mounted on the free end of the arm H, and means for supporting or balancing the weight or part of the weight of the electrodes.

7. The combination, with the battery box or support A, of the arm H, pivoted thereto, the rising and falling electrode or electrodes mounted on the free end of the arm H, means for supporting or balancing the weight or part of the weight of the electrodes, and means for automatically holding the electrodes at various depths of immersion.

8. The combination, with the battery box or support A, of the arm H, pivoted thereto, the rising and falling electrode or electrodes mounted on the free end of the arm H, means for supporting or balancing the weight or part of the weight of the electrodes, and a friction device for automatically holding the electrodes in any position in which they are set.

9. The combination, with the battery box or support A, of the arm H, pivoted thereto, the rising and falling electrode or electrodes mounted on the free end of the arm H, and the supporting and balancing spring M, arranged so as to exert a tension tending to support or balance the electrodes, which practically balances their weight at all points of their stroke.

10. The combination, with the battery box or support A, of the arm H, pivoted thereto, the electrode or electrodes mounted on the free end of the arm H, the arm J, attached or connected to the electrode so as to guide it, and the arm K, one end of which is also pivoted or connected to the support A and the other end of which is connected with the arm J, substantially as described.

11. The combination, with the battery box or support A, of the arm H, carrying the electrode or electrodes, the fixed holding arc or device S, and the moving holding device R, bearing upon or engaging with the fixed device S and connected with the arm so as to move with it, substantially as described.

12. The combination, with the battery box or support A, of the arm H, pivoted thereto and carrying the electrode or electrodes, the arm K, also pivoted to the support A and connected with the arm or portion J, and the spring M, one end of which is connected with some part of the rising and falling movement, so as to cause the lever-arm of the pull of the spring to decrease as the tension of the spring increases, substantially as described.

13. The combination, with the battery box or support A, of the arm H, pivoted thereto and carrying the electrode or electrodes, the arm K, pivoted at one end to the support A and at the other to the arm or portion J and formed with the extension O, and the spring M, one end of which is connected to the support A or fixed and the other end of which is connected to the end of the arm O, substantially as described.

14. The combination, with the battery box or support A, of the arm H, pivoted thereto and carrying the electrode or electrodes, the arm K, also pivoted to the support A, the arm or portion J, connecting the electrode and arm K, the fixed holding arc S, and the holding-spring R, attached to the end of the arm K and engaging with the arc S, substantially as described.

15. The combination, with the rigid arms or connecting portion E, formed with the carbon holder or support D at one end and the zinc holder or support F at the other, of the zinc holder or support F', rigidly attached to but insulated from the carbon-holder at one end, and the carbon-holder D, rigidly attached to but insulated from the zinc-holder F, and means connected to the bar for raising and lowering the electrodes thus rigidly connected together, substantially as described.

16. The combination of a series of zinc-holders, F, and a series of carbon-holders, D, the zinc-holder of each couple being rigidly connected with the carbon-holder of the next couple by a conducting arm or portion, and the carbon and zinc holders of each couple being rigidly attached to but insulated from each other, and means connected to the bar for raising and lowering the electrodes thus rigidly connected together, substantially as described.

SCHUYLER S. WHEELER.
CHARLES G. CURTIS.

Witnesses:
C. S. BRADLEY,
CHAS. J. MAGUIRE.